Oct. 14, 1969  W. M. BARDEAU ET AL  3,472,156
GRILLING OR BROILING APPARATUS
Filed April 5, 1968  2 Sheets-Sheet 1
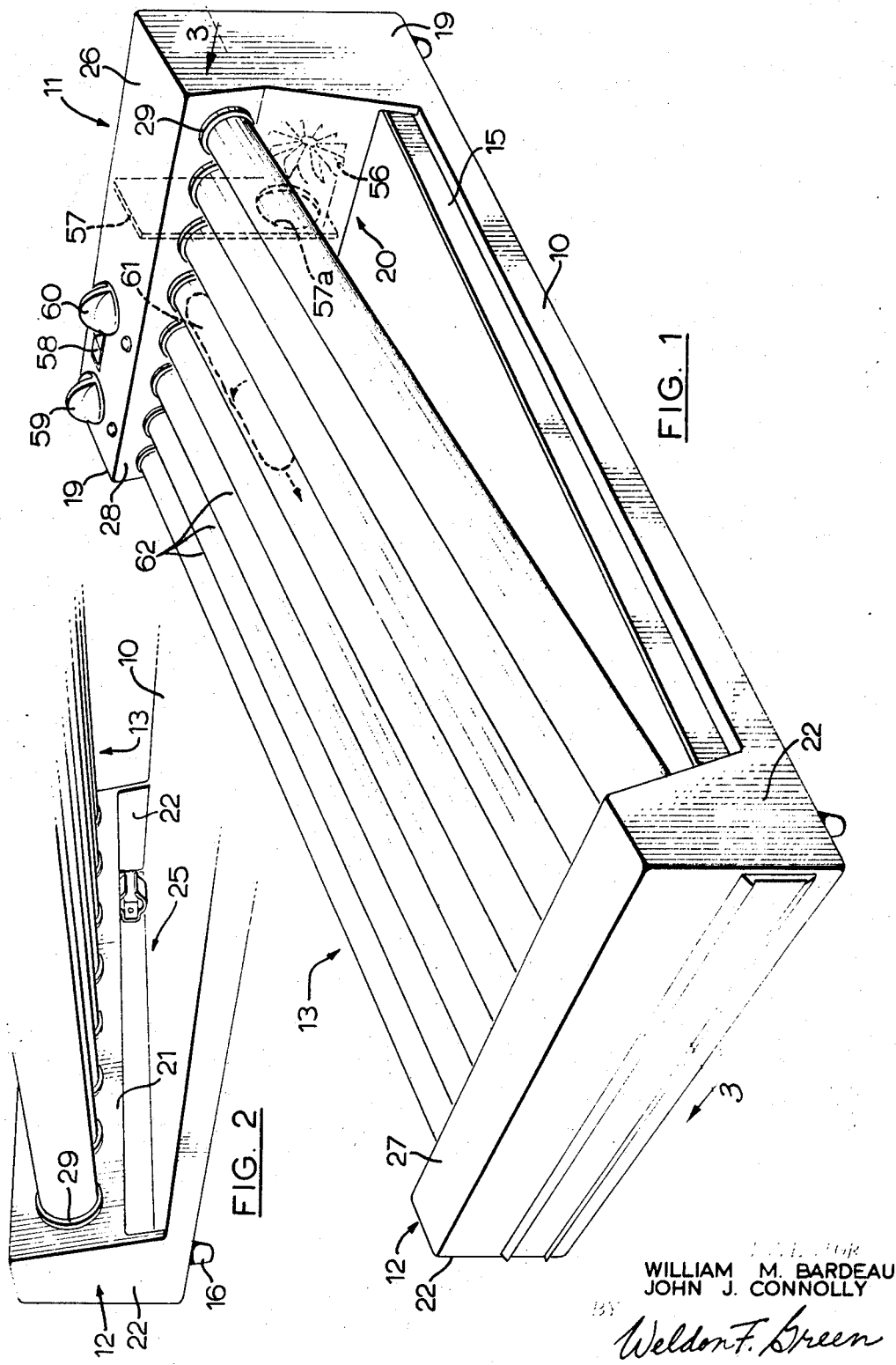
WILLIAM M. BARDEAU
JOHN J. CONNOLLY
Weldon F. Green
Agent

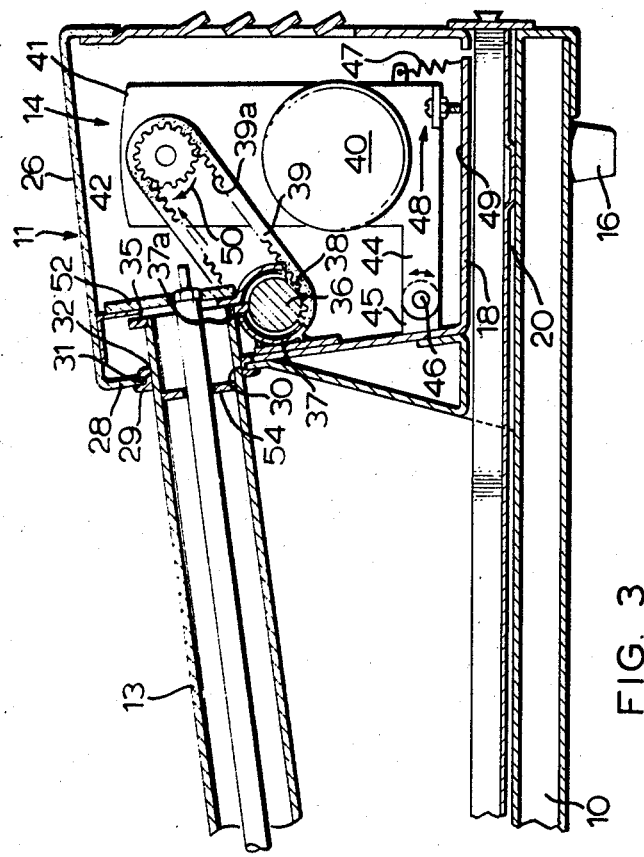
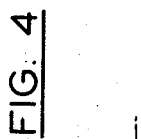
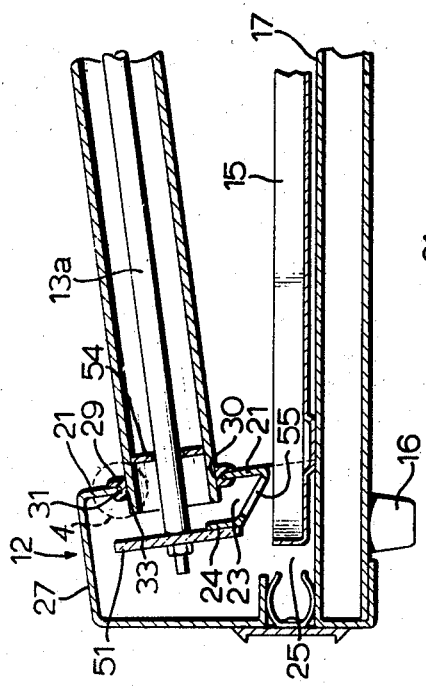
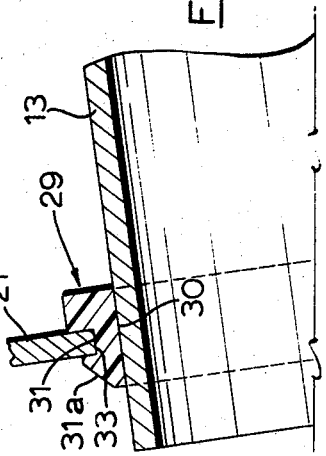
FIG. 3
FIG. 4
INVENTOR
WILLIAM M. BARDEAU
JOHN J. CONNOLLY
BY
Agent

United States Patent Office 3,472,156
Patented Oct. 14, 1969

3,472,156
GRILLING OR BROILING APPARATUS
William M. Bardeau, Islington, Ontario, Canada, and John J. Connolly, 667 Esplanade, Pelham Manor, N.Y. 10803; said Bardeau assignor to said Connolly
Filed Apr. 5, 1968, Ser. No. 718,993
Int. Cl. A47j 37/06; H05b 3/68
U.S. Cl. 99—423    11 Claims

ABSTRACT OF THE DISCLOSURE

Apparatus for grilling or broiling cylindrically-shaped articles of food such as a frankfurter or the like in which at least a pair of rolls are mounted for rotation in a plane inclined to the horizontal defining therebetween an uninterrupted open sided uniform sloping channel in which a frankfurter or the like is adapted to be placed adjacent the uppermost end for descent under gravity to the lowermost end, while rotational movement is imparted from the rolls to the frankfurter and heat is supplied to the channel to grill or broil it.

---

This invention relates to apparatus for grilling or broiling articles of food such as frankfurters, wieners, sausages or other articles of a generally cylindrical configuration in substantial quantities, and particularly apparatus which imparts uniform rotational movement to those articles while they are subjected to the application of heat.

Conventional equipment for grilling or broiling frankfurters, wieners, sausages or the like employs a framework in which several cylindrically-shaped tubes or rolls are mounted in a horizontal plane and in parallel relation for rotation in the same direction and are spaced apart a distance sufficient to define channels therebetween for the reception of those articles of food aforementioned and when disposed in the channels have imparted to them a slow rotational movement while heat is supplied from a suitable source of energy.

It will be appreciated that such equipment is normally intended for use in retail outlets where substantial quantities of food are continuously processed. In order to provide food which is heated or cooked to the desired degree the operator must carefully supervise the placement and removal of each article of food.

Also it has been observed in the operation of conventional equipment of the roller type as described above that the greases from the processed food tend to adhere to the surfaces of the rolls and flow along the surfaces to either end where they enter and accumulate in the bearings and other working parts. Such accumulated substances constitute a continuing maintenance problem and if not removed regularly may become rancid and present a potential hazard to health.

The objects of this invention therefore are to provide improved apparatus for grilling or broiling articles of food of the character aforementioned in commercial quantities, more efficiently than with conventional equipment and with a minimum of maintenance procedures and which can serve if desired as a display unit for direct viewing of the processing by customers.

The principal feature of this invention resides in providing framework adapted to support spaced parallel tubes or rolls for rotation in a plane inclined to the horizontal, the angle of inclination and the force of gravity governing in part the rate of descent of an article of food from the uppermost position in a channel defined by the rolls in its travel downwardly to the lowermost position and in part by the angular velocity imparted to the article of food by the rotating rolls. The angle of inclination and the angular velocity and the intensity of the heat supplied to the grill or broil the food can readily be correlated to insure that the food is fully grilled or broiled during the time taken to descend from the uppermost position to the lowermost position.

Further in that the rolls are inclined to the horizontal the greases from the processed food will flow downwardly towards the lower ends of the rolls and accumulate in the lowermost parts of the bearings. Hence, another feature of the invention resides in providing a simple annular bearing whose structure permits the accumulated greases to pass therethrough and by providing a trough or receptacle extending throughout the lower terminal portions of the rolls and below the bearings of each roll to receive the accummulated grease drippings and to conduct them to a removable receptacle or tray which can be easily cleansed.

Still another feature of the invention resides in providing a gear reduction apparatus which is directly connected to a motor with a spur gear take-off and providing a gear train for imparting synchronized rotational movement to the rolls with a spur gear drive, mounting the spur gear take-off, gear reduction apparatus and motor on a rigid supporting member, which in the preferred embodiment takes the form of a rigid casing for the gear reduction apparatus, to swing through an arc about a fixed pivot, with the aforesaid spur gears in alignment, from a closely spaced position to a limit position in which the spur gears have a maximum separation, connecting the spur gears with a flexible endless belt provided with teeth along its inner periphery corresponding to the teeth of the spur gears and having an extent to operatively engage the spur gears driving the endless belt through the spur gear take-off to move in a direction along its upper reach from the spur gear drive to the spur gear take-off and with the spur gears at maximum separation, and providing suitable spring means which normally urges the rigid casing housing the gear reduction apparatus and carrying the spur gear take-off and motor to the limit position.

With this arrangement should a roll seize or the gear train and associated spur gear drive be otherwise restrained from rotating the spur gear take-off will tend to travel along the upper reach of the toothed endless belt towards the spur gear drive to a position in which the belt just slips around the spur gear drive because of its slackness, thereby interrupting the direct drive to the gear train and avoiding damage to the mechanical parts thereof and the burning out of the motor. At the point where the endless belt slips the reactive force of the spring means instantly returns the casing support to the limit position fully re-engaging the endless belt with the spur gear take-off and spur gear drive. If the gear train and spur gear drive are still held stationary the same sequence described above will recur and the drive to the rolls will be immediately interrupted and will continue until the motor is disconnected or the restraint removed.

Still another feature of this invention resides in providing a supporting framework for the inclined rolls which is lower at the lower ends of the rolls than at the upper ends whereby when the lower ends are disposed towards a customer the food being processed is in full view.

These and other objects and features will become apparent upon reading the following specifications in conjunction with the accompanying drawings in which FIGURE 1 is a perspective view of the preferred embodiment of the improved apparatus;

FIGURE 2 is a perspective view of the lower end of the apparatus taken in a direction opposite to that illustrated in FIGURE 1 and with the upper end of the apparatus broken away; and FIGURE 3 is a view taken in vertical cross-section along the lines 3—3 of FIGURE 1, with the central portion of the apparatus broken away;

FIGURE 4 is an enlarged view of that portion of the apparatus within the circle indicated at 4 in FIGURE 3.

The improved apparatus for grilling or broiling articles of food of the character aforementioned comprises essentially as illustrated in FIGURE 1, a base 10, elongated upstanding hollow support structures 11 and 12 at opposite ends thereof, a plurality of inclined rolls 13 mounted for rotation in and extending between the inner opposing walls of support structures 11 and 12, an electrical resistance element 13a extending axially of each roll for supplying heat to each roll under applied electrical potential, a drive assembly indicated generally at 14 in FIGURE 3 and located within the walls of the hollow support structure 11 and a removable tray 15 adapted to be supported upon the base 10 to receive the drippings from the food being grilled or broiled.

Base 10, support structures 11 and 12, rolls 13 and tray 15 may be suitably fashioned from sheet metal sections, preferably of stainless steel.

Base 10 is preferably provided with integral leg 16 to hold the base 10 above the counter or other supporting surface and presents a generally flat horizontal upper surface 17.

Elongated hollow support structure 11 has a somewhat rectilinear configuration in cross-section as best seen in FIGURE 3 and whose lower wall 18 intermediately of the end walls 19 is spaced from the base 10 to define an access opening or passage 20 for the insertion and removal of the drip tray 15.

Elongated hollow support structure 12 likewise has a somewhat rectilinear configuration in cross-section as best seen in FIGURE 3, with the lower portion of the inner inclined wall 21 thereof between end walls 22 folded upon itself upwardly and inwardly to define an elongated trough portion 23 terminating in an upwardly extending flange 24 and defining with the base 10 an access opening or passage 25 into the interior of support structure 12 for the reception of one end of the drip tray 15.

In the preferred embodiment the support structures 11 and 12 are dimensioned and formed so that the upper walls 26 and 27 lie in an inclined plane whose angle of inclination corresponds to the angle of inclination of the rolls 13 and whose inner opposing walls 28 and 21 respectively are arranged at substantially right angles and in opposing parallel relation to one another.

In accordance with the invention each roll 13 is mounted in inclined relation to the base 10 which angle of inclination may lie in the range of from about 5° to 15° and extends substantially perpendicularly to the planes of the opposing walls 28 and 21 of the support structures 11 and 12.

Each roll 13 is provided with an annular bearing member 29 adjacent to each end which is preferably machined from a flexible durable plastic such as polytetrafluoroethylene. This substance is more easily flexed and expands slightly under the application of heat and has been found to be most suitable for this purpose.

Each bearing member 29 is provided with a smooth inner annular bearing surface 30 which is adapted to be sleeved onto the roll 13 and is dimensioned to fit snugly therearound but with sufficient clearance to enable the roll 13 to rotate freely therewithin under normal operating conditions.

The peripheral portion of each bearing member 29 is formed with an annular slot 31 which is accurately dimensioned to receive edge portions of generally circular aligned bearing apertures 32 and 33 inscribed in the inner opposing parallel walls 28 and 21 of support structures 13 and 14 respectively. The wall of bearing member 29 is chamfered as at 31a as indicated in FIGURE 4, which acts as a camming surface against the edge portions of apertures 32 or 33 when the bearing members 29 are forced under pressure to register with the edge portions of the aforesaid apertures.

The bearing members 29 are adapted to be heated until they become relatively flexible. In this heated condition with the chamfered surfaces 31a bearing against the peripheral edge portion of an aperture 32 or 33, and under the application of pressure the bearing members 29 will snap into place.

Under initial operating conditions and under rotational movement imparted to the rolls 13 the tolerances of the annular slots 31 of the plastic bearing members 29 with bearing apertures 32 and 33 are such that the bearing members 29 tend to rotate with the roll 13 within the bearing apertures 32 and 33 but as rotation continues and heat energy is supplied to the rolls the bearing members 29 tend to fully register with the edge portions of apertures 32 and 33 and thereafter remain stationary. With this arrangement a minimum load is taken by the drive assembly 14 for the rolls 13 under initial operating conditions at which interval it is usual to observe that accumulated greases from the processed food have solidified between the surfaces of the rolls 13 and the bearing surfaces 30 of bearing members 29 which tends to bind rolls 13 and bearing members 29, which binding action only disappears following rotation and the application of heat energy to the rolls, which melts the greases.

The mechanism for imparting rotation to the several rolls 13 in synchronism comprises a gear train consisting of a first series of aligned spur gears 35 swaged unto the upper ends of each of the rolls 13 and within the hollow support structure 11 and an elongated worm gear 36 mounted for rotation within suitable spaced bearing structure 37 carried by the support structure 11. The axis of the worm gear 36 is arranged to extend at right angles to the axes of the several spur gears 35 and in operative registration therewith, whereby under rotation imparted to the worm gear the several rolls 13 through their respective spur gears 35 are rotated in the same direction and at the same angular velocity.

The bearing structure 37 is provided with a longitudinally extending slot 37a of a width to receive the teeth of spur gear 35 therebetween in sliding fit, thereby holding them in aligned relation and preventing axial displacement thereof.

Swaged onto one end of the worm gear 36 is a spur gear drive 38 which is adapted to be engaged with a flexible endless belt 39 provided with teeth 39a along its inner periphery and engagable with the teeth of the spur gear drive 38.

In the preferred embodiment the endless belt 39 is adapted to be driven by a spur gear take-off 42 which in turn is driven through suitable gear reduction apparatus, not illustrated, by a motor 40.

The rigid casing housing the gear reduction apparatus is indicated at 41 and is adapted to support the motor 40 and the spur gear take-off 42 for rotation.

The rigid casing 41 is provided with an apertured lug 44 adjacent to lower end and extending to one side which apertured lug is adapted to register with a cooperating apertured lug 45 carried by support structure 11 for the reception of a pivot 46 which defines an axis for swinging movement of the rigid casing 41 for the purpose which will be explained in the following paragraphs.

A spring 47 anchored at one end to the support structure 11 and the other end to the rigid casing 41 normally urges the rigid casing in a direction downwardly to a limit position which is shown in solid outline in FIGURE 3, which limit position may be adjusted by means of an apertured internally threaded lug and associated threaded bolt and lock nut extending from the casing at one side thereof and indicated generally at 48. With this arrangement the lower end of the threaded bolt is adapted to bear against the surface of the lower wall 49 of the support structure 11 in the limit position.

In the limit position illustrated, the endless flexible toothed belt 39 has an extent such that it is adapted to be fully engaged with the spur gear take-off 42 and the spur gear drive 38. Hence under operation of the motor 40 the gear train is driven to impart rotation to the rolls 13.

In the arrangement illustrated it is necessary to provide that the spur gear take-off 42 rotates in a direction indicated by the arrow 50 in FIGURE 3. If one of the rolls 13 should seize or be otherwise restrained against rotation the gear train including the spur gears 35 and worm gear 36 and spur gear drive 38 will be held against rotation. With the teeth 39a of the endless belt 39 engaged with the teeth of the spur gear drive 38 the belt 39 will be unable to be driven. Spur gear take-off 42, however, driven directly by the motor 40 through gear reduction apparatus will continue to rotate causing it to be displaced along the teeth 39a of the upper reach of the endless belt 39 and in a direction towards the spur gear drive 38. With this arrangement the endless belt 39 is released from spur gear drive until it just slips over the teeth of the spur gear thereby momentarily disconnecting the direct drive to the rolls 13.

Spur gear take-off 42 in moving along the upper reach of the endless belt 39 displaces the rigid casing 41 to the left as seen in FIGURE 3 of its pivot 46 tensioning the spring 47. Upon reaching the position in which the endless belt just slips over the teeth of the spur gear drive 38, the tensioned spring 47 instantly returns the casing member 41 to the limit position re-registering the teeth 39a of the endless belt 39 with the teeth of the spur gear drive 38 and spur gear take-off 42.

If the restraint is maintained spur gear take-off 42 will again travel along the upper reach of the endless belt 39 to the position where the endless belt just slips over the teeth of the spur gear drive 38 and the drive momentarily interrupted. With this arrangement damage to the gear train and burning out of the motor is avoided.

On the other hand if the restraint is withdrawn the drive to the rolls 13 will be automatically re-established.

The sharp sounds emitted when the bolt of adjusting arrangement 48 strikes the wall 49 warns the operator that a roll has seized or that there has been a breakdown. Alternatively, the movement imparted to the casing 41 could be used to trip a switch to energize a circuit in which a warning light would flash or a bell or buzzer sound.

It will be seen in FIGURE 3 that the flange 24 upstanding from the trough portion 23 serves as a mounting for an electrical insulator 51 in the form of an elongated rigid plate and which extends at right angles to the open lower ends of the tubular rolls 13 and in spaced relation thereto.

It will also be observed in FIGURE 3 that an angle member 52 is secured to the lower surface of the upper wall 26 within the support structure 11, whose downwardly extending flange serves as a mounting for a similar electrical insulator in the form of an elongated rigid plate 53 and which plate extends at right angles to the open upper ends of the tubular rolls 13 and in spaced relation thereto.

The electrical resistance elements 13a extend axially of each of the rolls 13 and are supported from the respective insulator plates 51 and 52 in any suitable manner. The wiring for energizing the resistance elements 13a has not been illustrated, but it will be understood that any suitable wiring arrangement can be employed.

Each roll 13 is preferably provided with internal spaced annular partitions 54 one adjacent to each end to define an internal chamber substantially isolated from the atmosphere to prevent the escape of heated air during operation of the apparatus and thereby increase the efficiency of the heat transfer from the resistance elements 13a to the rolls 13.

The manner of supplying heat to the apparatus by electrical resistance elements is optional. Heat can also be supplied by overhead electrical resistance elements or by infra-red lamps or in any other suitable manner.

The trough portion 23 formed by bending up the lower edge of the inner wall 21 of the support structure 12 together with the flange portion 24 supporting the insulator 51 defines a channel opening upwardly to receive grease drippings which have accumulated at the lower ends of the rolls 13 some of which pass between the bearing surfaces 30 of the bearing members 29 and the surfaces of the rolls 13. This simple configuration of the bearing members 29 and the inclined attitude of the rolls 13 together provide an arrangement whereby accumulation of greases is avoided in the bearings and a direction of flow is created, leaving the upper driven ends of the rolls substantially free of such substances.

The lowermost wall of trough 23 is provided preferably with a series of apertures 55 to permit the escape of the drippings from the trough 23 to the underlying tray 15 which extends beyond the apertures 55.

A fan 56 shown in broken outline in FIGURE 1 is provided for drawing cooling air through the hollow support structure 11 and is mounted on the driven shaft of motor 40 carried by casing 41. It has been found that by providing an interior partition or wall 57 to substantially enclose that portion of the hollow support structure 11 in which the motor 40 and fan 56 are located and by forming an opening 57a in the wall in which the fan blades register that a pattern of air flow is created sufficient to cool the operating parts and the surrounding structure to a satisfactory level.

Control switch 58 is located in the motor circuit of the apparatus and controls the operation of the motor. Switch 59 which takes the form of a percentage switch in the preferred embodiment controls the application of electrical potential to the electrical resistance elements 13a of the first bank of four rolls 13 and the other percentage switch 60 controls the application of electrical potential to the electrical resistance elements 13a of the second bank of four rolls 13. With this arrangement different foods can be cooked at different temperatures in the apparatus at the same time.

A brief description of the operation of the apparatus will suffice. The motor 40 is energized by actuating switch 58. A selected motor 40 rated at 120 r.p.m.'s for example can be geared down through suitable gear reduction apparatus to drive the rolls 13 at 4 r.p.m.'s or above that level if desired. The electrical potential applied to the electrical resistance elements 13a is controlled through the operation of percentage switches 59 and 60 respectively.

Frankfurters or other similar articles of food, illustrated in broken outline in FIGURE 1 as at 61 placed within the channels 62 defined by adjacent rolls 13 at the upper ends will immediately have imparted to them rotational movement by the rolls to turn them slowly in the same direction as indicated by the arrow. At the same time heat energy is applied to them through the walls of the tubular rolls by the energized electrical resistance elements 13a.

Contemporaneously with the imparting of rotational movement and the application of heat the first batch of frankfurters descend under gravity in their channels towards the lowermost position. As soon as the first batch move downwardly out of the uppermost position a second batch is loaded into the channels in the uppermost position with the third and succeeding batches supplied in a like manner.

By adjusting the intensity of the heat supplied through percentage switches 59 and 60 the frankfurters will be grilled to the desired degree in that interval of time taken by the frankfurters in travelling from the uppermost position to the lowermost position. Hence, as soon as they reach the lowermost position they will be done and should be immediately removed. This arrangement therefore, relieves the operator from constantly supervising the

What we claim as our invention is:

1. Apparatus for processing articles of food comprising at least a pair of generally cylindrically-shaped rolls, means supporting said rolls in inclined spaced relation to define an uninterrupted open sided uniform sloping channel for the reception and support of a generally cylindrically-shaped article of food, means for rotating said inclined rolls in the same direction and means for supplying heat energy to said sloping channel.

2. Apparatus according to claim 1 in which said means supporting said inclined rolls comprises a base underlying said rolls upstanding support structures mounted at opposite ends of said base and presenting opposing wall portions arranged in substantially parallel relation and at right angles to the axes of said inclined rolls, said opposing wall portions being provided with aligned circular bearing apertures for the reception of the ends of said inclined rolls respectively and bearing means registrable within said bearing apertures for supporting said rolls within said bearing apertures for rotation.

3. Apparatus according to claim 2 in which each said bearing means comprises a resilient annular bearing member which is adapted to be sleeved unto each end of each inclined roll and presents an inner annular bearing surface to said roll said annular bearing member having an outer annular slot opening to the periphery and adapted to snugly register for rotation within its bearing aperture upon initial rotational movement imparted thereto by its respective roll, and upon continued rotation and the application of heat to grip the peripheral edges of the bearing apertures whereby each said bearing member is frictionally held against rotational movement and remains stationary supporting said rolls therewithin under continued rotational movement imparted thereto.

4. Apparatus according to claim 3 in which said annular bearings are moulded from polytetrafluoroethylene.

5. Apparatus according to claim 2 in which said supporting structure supporting the lower ends of said inclined rolls has a height dimension throughout its extent lower than the height dimension of the support structure supporting the upper ends of the inclined rolls.

6. Apparatus according to claim 2 in which one of said support structures is spaced intermediately of its ends above the base and is open at either side to define with the base a passage thereunder, and the other of said support structures is provided with an opening beneath the inner opposing wall portion thereof which passage and opening are aligned and dimensioned to receive a removable tray member in sliding registration therewith and which tray member has an area sufficient to underlie said rolls, whereby drippings from the processed food and rolls can be collected.

7. Apparatus according to claim 6 in which the inner wall portion of the support structure supporting the lower ends of the inclined rolls is provided with an integral trough formation inwardly of its opposing wall formation immediately above the opening therein and extending parallel to the aforementioned wall portion and below the bearing apertures and opening upwardly and having a width dimension exceeding the extent of the ends of the rolls inwardly of the aforementioned wall, whereby drippings from the roll ends and associated bearing means are collected in said trough formation, said trough formation being provided with apertures means therethrough at the lowermost portion thereof whereby the collected drippings are conducted to the tray member therebelow.

8. Apparatus according to claim 1 in which the angle of inclination of said roll lies within the range from about 5° to 15° to the horizontal.

9. Apparatus according to claim 1 in which the inclined rolls are tubular and said means for supplying heat energy to said channel include electrical resistance means mounted to extend axially through each tubular inclined roll supported on electrical insulator means carried by said means supporting said rolls, whereby under the application of electrical potential to said electrical resistance means heat energy is supplied to said rolls by radiation and convection for transmission therethrough to said channel.

10. Apparatus according to claim 1 in which means for rotating said inclined rolls includes gear train means for imparting rotational movement to said rolls in synchronism, spur gear drive means carried by said gear train means, spur gear take-off means, means supporting said spur gear take-off means in alignment with said spur gear drive means for swinging movement from a limit position remote from said spur gear drive means to a position approaching same, means normally urging said supporting means to said limit position, and an endless belt, toothed along its inner periphery registering with said aligned spur gear drive means and spur gear take-off means and having an extent to operatively engage same in said limit position only, and means for driving said spur gear take-off means to drive said endless belt in a direction such that the upper reach thereof moves from said spur gear drive means to said spur gear take-off means, whereby under force applied to said gear train means to halt same, said spur gear take-off means is urged to travel along the upper reach of said endless belt from the limit position to a position approaching said spur gear drive means in which said endless belt just slips therearound thereby momentarily interrupting the drive to said gear train means whereupon said means normally urging said means supporting said spur gear take-off means instantly returns same to said limit position whereupon said endless belt is reregistered with said spur gear drive means and spur gear take-off means and drive to said gear train means resumed.

11. Apparatus according to claim 10 in which said means for driving said spur gear take-off means is a motor and associated gear reduction apparatus, said motor and associated gear reduction apparatus and spur gear take-off means being mounted to swing as a unit upon said means supporting said spur gear take-off means from said limit position to said position approaching said spur gear drive means and reversely.

References Cited

UNITED STATES PATENTS

| | | | |
|---|---|---|---|
| 2,185,979 | 1/1940 | Dumas | 99—423 |
| 2,905,076 | 1/1959 | Del Francia | 99—443 |
| 3,298,303 | 1/1967 | Waller | 99—423 |
| 3,369,481 | 2/1968 | Pappas | 99—445 |

WALTER A. SCHEEL, Primary Examiner

A. O. HENDERSON, Assistant Examiner

U.S. Cl. X.R.

99—425